(12) United States Patent
Alabes et al.

(10) Patent No.: US 10,216,513 B2
(45) Date of Patent: Feb. 26, 2019

(54) PLUGIN FOR MULTI-MODULE WEB APPLICATIONS

(71) Applicant: Oracle International Corporation, Redwood Shores, CA (US)

(72) Inventors: Tomas Alabes, Foster City, CA (US); Nicolas Laplume, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 3 days.

(21) Appl. No.: 15/438,487

(22) Filed: Feb. 21, 2017

(65) Prior Publication Data

US 2018/0074815 A1    Mar. 15, 2018

Related U.S. Application Data

(60) Provisional application No. 62/395,384, filed on Sep. 16, 2016, provisional application No. 62/395,341, filed on Sep. 15, 2016.

(51) Int. Cl.
*G06F 9/44* (2018.01)
*G06F 8/71* (2018.01)
*G06F 9/445* (2018.01)

(52) U.S. Cl.
CPC ............ *G06F 8/71* (2013.01); *G06F 9/44526* (2013.01)

(58) Field of Classification Search
CPC .......................................................... G06F 8/71
USPC ........................................................ 717/121
See application file for complete search history.

(56) References Cited

U.S. PATENT DOCUMENTS

| | | | | |
|---|---|---|---|---|
| 5,732,192 A | * | 3/1998 | Malin | G06F 17/5036 703/2 |
| 6,393,481 B1 | * | 5/2002 | Deo | H04M 3/42136 340/522 |
| 6,425,005 B1 | * | 7/2002 | Dugan | H04M 15/90 379/201.01 |
| 6,847,993 B1 | * | 1/2005 | Novaes | G06F 9/5061 370/216 |
| 6,892,231 B2 | * | 5/2005 | Jager | H04L 29/06 370/254 |
| 2006/0036570 A1 | * | 2/2006 | Schaefer | G06F 9/44505 |
| 2009/0106542 A1 | * | 4/2009 | Dubs | G06F 9/44505 713/1 |
| 2010/0169392 A1 | * | 7/2010 | Lev Ran | G06F 9/546 707/827 |
| 2010/0241731 A1 | * | 9/2010 | Du | G06F 17/30067 709/218 |

* cited by examiner

*Primary Examiner* — Evral E Bodden
(74) *Attorney, Agent, or Firm* — Trellis IP Law Group, PC

(57) ABSTRACT

Implementations generally relate to managing module dependencies. In some implementations, a method includes determining, at a server, dependencies associated with each software module of a process. The method further includes aggregating the dependencies associated with the software modules. The method further includes storing the aggregated dependencies in one or more configuration files, where the configuration file includes one or more dependency paths associated with each of the dependencies. The method further includes updating one or more of the dependency paths in the configuration files based on one or more changes to one or more of the dependency paths.

20 Claims, 6 Drawing Sheets

PLUGIN FOR MULTI-MODULE WEB APPLICATIONS

CROSS REFERENCES TO RELATED APPLICATIONS

This application claims priority from U.S. Provisional Patent Application Ser. No. 62/395,384, entitled PLUGIN FOR MULTI-MODULE WEB APPLICATIONS, filed on Sep. 16, 2016 (Trellis ref ORACP0165P/Client ref. ORA170294-US-PSP), and U.S. Provisional Patent Application Ser. No. 62/395,341, entitled SYSTEM FOR PROCESS CLOUD SERVICE, filed on Sep. 15, 2016 (Trellis ref ORACP0192P/Client ref. ORA170390-US-PSP), which are hereby incorporated by reference as if set forth in full in this application for all purposes.

BACKGROUND

Efficient, adaptable, and insightful management systems and methods can be particularly important in enterprise applications, where accurate management and informed decision making can enhance enterprise profits. Some management systems improve corporate performance by managing and optimizing a company's processes. Such systems enable organizations to be more efficient and effective. Software modules are typically combined into one software program to provide a management system, and such software modules may rely on one another using dependencies.

SUMMARY

Implementations described herein generally relate to managing module dependencies. In some embodiments, a non-transitory computer-readable storage medium carries one or more sequences of program instructions thereon. When executed by one or more processors, the instructions cause the one or more processors to perform operations including determining, at a server, dependencies associated with each software module of a process; aggregating the dependencies associated with the software modules; storing the aggregated dependencies in one or more configuration files, where the configuration file includes one or more dependency paths associated with each of the dependencies; and updating one or more of the dependency paths in the configuration files based on one or more changes to one or more of the dependency paths.

A further understanding of the nature and the advantages of particular embodiments disclosed herein may be realized by reference of the remaining portions of the specification and the attached drawings.

DETAILED DESCRIPTION OF EMBODIMENTS

Figure 1:
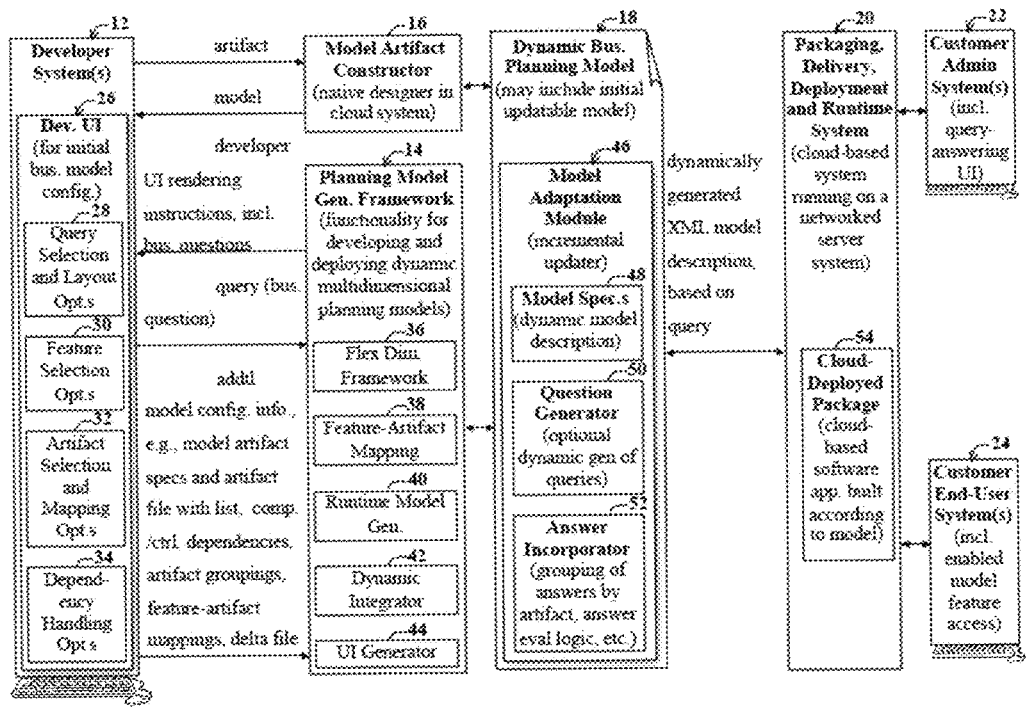
FIG. 1 illustrates an example block diagram of a system, which may be used for implementations described herein.

Implementations described herein generally relate to managing module dependencies. Implementations provide a plugin that enables users such as developers to work seamlessly with software modules. Large teams of developers or programmers write numerous modules that are dependent on each other, and use RequireJS, a JavaScript file and module loader, to manage those dependencies. RequireJS facilitates in optimizing development of processes such as business processes. The plugin provides a configuration file that manages module dependencies. RequireJS configurations intelligently merge module dependences with a current module's dependencies, making the development and maintenance of modules much easier.

In some implementations, a method includes determining, at a server, dependencies associated with each software module of a process. The method further includes aggregating the dependencies associated with the software modules. The method further includes storing the aggregated dependencies in one or more configuration files, where the configuration file includes dependency paths associated with each of the dependencies. The method further includes updating one or more of the dependency paths in the configuration files based on one or more changes to one or more of the respective dependency paths.

In various implementations, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, e.g., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

In various implementations, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

An enterprise computing environment may be any collection of computing resources of an organization used to perform one or more tasks involving computer processing. An example enterprise computing environment includes various computing resources distributed across a network, and may further include private and shared content on intranet web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, sales data, and so on, of an enterprise. Examples of enterprise software include enterprise resource planning (ERP) software for facilitating managing enterprise activities (e.g., product planning, inventory management, marketing, sales, and so on). Example ERP applications include customer relationship management (CRM), human capital management (HCM), business intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Note that conventionally, while certain financial tools, tables, and so on (e.g., balance sheets, cash flow statements, etc.), are standardized, different companies may prefer to maintain and view operational and financial planning data and tasks differently, e.g., in accordance with different business and computing environment requirements. This can be particularly true at granular levels, i.e., where detailed enterprise data must be observed and analyzed in accordance with business planning objectives.

For example, a particular service company may experience substantial compensation expenses (e.g., payments to employees, contractors, etc.), which may represent the primary driver for expense planning. Similarly, a small consulting company may experience substantial travel expenses, which may represent a primary driver for expense planning. Accordingly, two different service companies may base their expense planning on substantially different drivers.

Similarly, different companies may employ different methods of accounting, e.g., a direct method or indirect method of accounting. Accordingly, different companies may rely upon different drivers for handling accounting details.

Furthermore, the granularity of planning (i.e., the level of detail demanded or required) may vary across different companies and/or business types, segments, or other domains. For example, a fast moving consumer goods company may plan revenue by product, market, channel, and segment, whereas an information technology (IT) company may plan revenue by service, market, and customers. Accordingly, different companies may rely upon different drivers for various types of planning.

In addition, while certain companies may prefer to perform business planning using a collection of standard or common drivers and associated software modules and functionality (e.g., standard labor, material, etc.), other companies may prefer to perform direct entry for project expenses, revenue, etc.

Accordingly, different businesses may have different planning requirements or needs, which can be difficult to meet using conventional static business planning modules and associated software applications. Certain implementations discussed more fully below provide systems and accompanying mechanisms and methods for enabling dynamic adaptation of an existing initial business planning model (which may be called a seed model herein), thereby enabling the initial seed planning model to uniquely grow to meet individual or specific needs of a given business or organization.

For clarity, certain well-known components, such as hard drives, processors, operating systems, power supplies, routers, Internet service providers (ISPs), identity management systems, workflow orchestrators, process schedulers, integration brokers, tenant automation systems (TASs), online analytical processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 illustrates an example block diagram of a system 100, which may be used for implementations described herein. In various implementations, system 100 is an enterprise-computing environment configured to enable initial development of a dynamic business planning model 18. In various implementations, system 100 incrementally updates business planning model 18 to meet specific enterprise needs, and uses resulting updated business planning model 18 as part of a cloud-based enterprise software application or service 54 (labeled "Cloud-Deployed Package"). While system 100 performs implementations described herein, in other implementations, any suitable component or combination of components associated with system 100 or any suitable module or module s associated with system 100 may facilitate performing the implementations described herein. In various implementations, system 100 may not have all of the components shown and/or may have other elements including other types of modules instead of, or in addition to, those shown herein.

System 100 includes a developer computer system 12 (labeled "Developer System(s)") that is in communication with a planning model generation framework 14 and a model artifact constructor 16. Computer system 12 may also be referred to herein as the developer system or the developer computer. Model artifact constructor 16 may leverage preexisting functionality, e.g., as may be available via a native designer in a cloud computing system implemented as part of system 100.

Planning model generation framework 14 and model artifact constructor 16 that are leveraged to develop business planning model 18, may further communicate with a packing, delivery, deployment and runtime system and/or computing framework 20 (labeled "Packaging, Delivery, Deployment and Runtime System"). Modules 14-20 may be hosted in a cloud, i.e., a server system accessible via a network, such as the Internet.

A cloud-deployed package 54, i.e., software application, embodying business planning model 18 is may be hosted in the cloud, i.e., cloud-based. For the purposes of the present discussion, cloud-based software may be any software run on one or more servers and accessible to client systems via a network used to communicate with the software.

In some implementations, cloud-deployed package 54 may represent a software application that may provide one or more web services for use by other software applications, and/or may provide cloud-services, e.g., on a subscription basis, to one or more client systems, e.g., a customer administrator system 22 (labeled Customer Admin System(s), and a customer end-user system 24 (labeled Customer End-User System(s). For the purposes of the present discussion, the term "customer" refers to any user, such as an administrator and/or end user, e.g., who may be part of an organization that has access to cloud-deployed package 54.

In some implementations, a developer system 12 accesses model artifact constructor 16 and planning model generation framework 14 via a network, such as the Internet. Developer system 12 may include a browser used to browse to the network address that provides access to functionality provided by model artifact constructor 16 and planning model generation framework 14.

After browsing to a network address allotted for system developers, designers, and/or other qualified personnel, various dynamic model-building functionality is accessible to the developer system, e.g., via various developer UI display screens 26 (labeled "Dev. UI").

Software functionality may be any function, capability, or feature, e.g., stored or arranged data, that is provided via computer code, e.g., software. Generally, software functionality may be accessible via use of a UI, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

Software functionality, or a set of software functionalities, that is/are associated with or used by a business planning model, is called a model feature (or simply feature) herein. Examples of features include, but are not limited to, software functionality for implementing indirect cash flow statements, income statements, and so on.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software. The terms UI control and UI component (or simply component) may be employed interchangeably herein.

A descriptor or characteristic of a business planning model and/or associated UI display screens and/or UI layout, is called a model artifact (or simply artifact) herein. Examples of model artifacts include, but are not limited to metadata (e.g., metadata describing a UI layout or UI model framework), dashboards, business rules, forms, dimensions, and so on.

Artifacts may represent or be associated with categories of features or software functionality. When functionality is associated with a business model artifact, the artifact may be seeded with one or more functionalities or features.

Artifacts and features may be dependent or independent. A dependent artifact or feature is one that relies upon the existence or operation of another artifact or feature for proper functioning. Similarly, an independent artifact or feature may be added to a model without requiring special handling of interdependencies, as discussed more fully below. Examples of potential dependent artifacts include, but are not limited to composite forms, rule sets, and so on.

A valid artifact may be any artifact that may be associated with (e.g., seeded with) one or more features that are available for a business planning model. The availability of a feature to an artifact may be defined in initial business planning model 18, e.g., by a developer using business planning model designer software represented by planning model generation framework 14 and model artifact constructor 16 of FIG. 1.

In some implementations, developer UI display screens 26 include a query-selection UI display screen (and/or set of UI controls) 28, a feature-selection UI display screen 30, an artifact-selection UI display screen 32 (labeled "Artifact Selection and Mapping Opts," and an artifact and feature dependency handling UI display screen 34.

Planning model generation framework 14 includes a flex-dimension framework 36, a feature-artifact mapping module 38, a runtime model generator 40, a dynamic functionality integrator 42, and a UI generator 44.

Generated, dynamic, business planning model 18, which may be defined by and/or specified via an extensible markup language (XML) document, includes a specification 48 (labeled "Model Specs") of business planning model 18, and optionally, embedded question generator code (or a link to code) 50 and answer incorporator 52, e.g., for facilitating incorporating answers to business questions, as may be provided via the customer administrator system 22 (labeled "System(s)," as discussed more fully below.

Packaging, delivery, deployment, and runtime system 20 hosts and runs deployed cloud-based software package or application 54, also referred to as "cloud-deployed package" 54. Functionality of deployed application 54, also referred to as "cloud-deployed package 54," is accessible to customer end-user client system 24.

Note that in general, groupings of various modules of system 100 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, a question generator 50 and answer incorporator 52 shown as part of dynamic business planning model 18 may instead, or in addition, be incorporated into planning model generation framework 14.

Furthermore, certain modules of planning model generation framework 14 may be implemented client-side, e.g., on developer system 12. In general, certain server-side, i.e., cloud-based modules (e.g., running on a server or server system) may be implemented client-side (e.g., running on a client computer communicating with a server), and vice versa, in a manner different than shown in FIG. 1.

In an example scenario, a business model developer (also called designer herein) employs developer system 12, e.g., artifact-selection screen 32, to specify, access, and/or configure model artifacts, leveraging model artifact constructor 16. Artifact-selection screen 32 presents one or more UI controls (which may provide so-called user options, or simply options) for facilitating developer construction, selection, and configuration of model artifacts, as well as UI controls enabling configuration and/or specification of mappings and/or rules associated with the artifacts. The mappings discussed herein refer to associations between business model artifacts and features, and are also called feature-artifact and/or artifact-feature mappings.

After developing and/or configuring a set of one or more business model artifacts, e.g., by leveraging artifact-selection screen(s) 32 and associated model artifact constructor 16, the resulting artifacts may be stored locally or via the server system that hosts modules 14-20.

Next, in the present example scenario, the developer employs feature-selection screen 30 to select and/or configure a set of business model features. Feature construction and/or selection may also be facilitated via model artifact constructor 16 and/or code run as part of planning model generation framework 14, e.g., via code run on feature-artifact mapping module 38.

After initial selection and/or configuration of a set of one or more model artifacts and one or more model features, the developer may employ one or more UI controls of artifact-selection screen 32 to configure and/or specify initial mappings and/or associated mapping rules that define associations between the configured artifacts and features.

Artifact-selection and mapping screen 32 may include UI controls that leverage the functionality of feature-artifact mapping module 38 of planning model generation framework 14. Feature-artifact mapping module 38 may include additional code for implementing automatic feature-artifact mappings in accordance with groupings of business questions and/or answers to the business questions, e.g., so as to automatically update dynamic business planning model 18, as discussed more fully below.

UI generator 44 of planning model generation framework 14 includes code for generating rendering instructions to render developer-side UI display screens 26, and further includes code for generating rendering instructions for UI display screens of cloud-deployed package 54, which are exposed to customer end-user system 24.

Developer-side query-selection and layout options screen 28 includes UI controls and access to associated functionality for defining, selecting, and/or grouping business questions (called queries) to be exposed in a UI display screen accessible to customer administrator system 22. The UI display screens are displayed as part of the dynamic business planning model 18 and are exposed to the customer administrator system 22, and include a UI display screen that lists business questions that have been enabled for existing dynamic business planning model 18.

The initial business questions selected by a developer using query-selection and layout options screen 28 may be listed and/or otherwise formatted in accordance with developer-selected layout options provided via query-selection and layout options screen 28. UI controls of query-selection and layout options screen 28 provide developer-access to associated functionality (e.g., functionality which may be provided via UI generator 44 and feature-artifact mapping module 38 and/or other modules of planning model generation framework 14) for defining, selecting, and/or otherwise configuring business questions and how the questions will be laid out in a UI display screen exposed to a customer administrator, e.g., via customer administrator system 22.

Mappings of artifacts are grouped by business question or by business question group or type. Mappings of artifacts to features may depend, in part, on the business questions established via use of query-selection and layout options screen 28.

The developer may further specify dependency-handling options via one or more UI controls provided in dependency-handling options screen 34. The dependencies may include dependencies between business questions (e.g., in cases where the answer to one business question may affect other questions or answers, and dependencies between different artifacts (and/or groups or types of artifacts), and dependencies between different features (and/or groups or types of features). Such dependencies may require that a change (e.g., difference) in one question, artifact, and/or feature, be propagated to another question, artifact, and/or feature.

Various implementations discussed herein may employ difference or delta processing to ensure that dependencies are handled without introducing conflicts. This involves referencing the established associations and associated selected configuration options (e.g., as may be specified by a developer via dependency-handling options screen 34) and making adjustments to the business model based thereon and in response to a detected change in an artifact, feature, question, etc.

Accordingly, developer system 12 forwards business question selections and associated identifications, descriptions, and/or configuration information (e.g., as may be provided responsive to developer manipulation of query-selection and layout options screen 28) to business planning model generation framework 14. In addition, various additional UI controls included among developer UI display screens 26 may enable specification and forwarding of additional information to planning model generation framework 14, including, but not limited to additional business model configuration information, e.g., model artifact specifications, an artifact file listing artifacts for an initial business planning model, component (e.g., UI control) dependencies (between UI controls to be rendered and exposed via cloud-deployed package 54), artifact grouping information, feature-artifact mapping data, delta file specifications (e.g., describing dependencies between various questions, artifacts, and/or features), feature specifications, flex dimension configuration parameters and/or specifications, and so on.

Business planning model generation framework 14 then processes the inputs received via developer system 12 to automatically construct an initial business planning model, also called the seed model. Some example modules usable to construct initial dynamic business planning model 18 and to implement incremental updates thereto, include, but are not limited to flex dimension framework 36, feature-artifact mapping module 38, runtime model generator 40, dynamic integrator 42, and UI generator 44.

Flex dimension framework 36 includes computer code for enabling customer administrators (e.g., using customer administrator system 22) and/or customer end users (e.g., using customer end-user system 14) to add flex dimensions to various UI display screens exposed via cloud-deployed package 54. Flex dimension framework 36 then enables extension of business planning model 18 in accordance with the added flex dimensions. Note that whether initial business planning model 18 supports flex dimensions, which flex dimensions, if any, are supported, and behaviors of the flex dimensions, may be specified by a developer via one or more UI controls provided in developer UI display screens 26.

Feature-artifact mapping module 38 includes computer code for enabling automatic implementation of changes introduced to dynamic business planning model 18 in response to answers provided in response to business questions posed to an administrator (or other authorized user) of customer administrator system 22. In particular, when an administrator provides a new answer to a question (e.g., which may be posed via a UI prompt, such as a check box), any artifacts associated with the question are then automatically populated with features via feature-artifact mapping module 38. The resulting populated artifacts are then incorporated into updated dynamic business planning model 18 after any artifact and/or feature dependencies are handled and/or deltas are processed.

Runtime model generator 40 includes computer code for automatically generating a new or updated dynamic business planning model 18 for incorporation into cloud-deployed package 54. The updates to running cloud-deployed package 54 by runtime model generator 40 may be implemented via patching and/or other known technologies for adjusting running software applications.

Dynamic integrator 42, which may communicate with other modules of planning model generation framework 14, facilitates implementing delta differencing processing to accommodate newly added functionality without introducing conflicts in updated business planning model 18. Integrator 42 may further include computer code for facilitating and/or ensuring efficient interoperability between different intercommunicating business planning models and associated software applications deployed via packaging, delivery, deployment, and runtime system 20.

Note that information exchange between developer system 12 and between various cloud-based modules 14-20 may be implemented via exchange of XML files that are also transferred between the system and modules. Furthermore, dynamic business planning model 18 may be implemented substantially via an XML document defining the model.

In some implementations, dynamic business planning model 18 includes a model adaptation module 46, which includes computer code for facilitating some self-adaptation of dynamic business planning model 18. Note that in other implementations, model adaptation module 46 may be included instead in planning model generation framework 14.

In some implementations, model adaptation module 46 includes, in addition to a description of the business planning model (including a description of existing questions, artifacts, and associated features), a specification of code for dynamic question generator 50 and answer incorporator 52.

Dynamic question generator 50 may include computer code (and/or links thereto) for automatically adjusting a list of business questions exposed via a UI of customer administrator system 22, e.g., in response to one or more answers provided thereby by an administrator using customer administrator system 22. This may be particularly useful for reconfiguring listing of displayed questions in response to an answer to a question that affects the validity of other questions displayed in (or to be displayed among) the listing of business questions.

Answer incorporator 52 may include computer code (and/or links thereto) for adjusting groupings of artifacts by answers and/or answer type or category. Answers to the business questions may be evaluated by evaluation logic to determine how a new listing of questions should be generated and laid out (in the UI exposed to the customer administrator system 22).

Note that various modules 36-44 of the business planning model generation framework 14 may intercommunicate, e.g., via interfacing functionality incorporated therein. Similarly modules 48-52 of model adaptation module 46 of dynamic business planning model 18 may intercommunicate.

Once initial business planning model 18 is developed and/or configured via developer system 12, it can be deployed as cloud-deployed package 54, which is then made available to customer administrator system 22 and customer end-user system 24. The customer administrator may then use customer administrator system 22 to answer business questions. The resulting answers then feed back to framework modules 14-20, which then adapt or update dynamic business planning model 18 in accordance with the answers. The adjustment to dynamic business planning model 18 is effectuated through use of artifacts, which are then mapped or seeded with features corresponding to the answered questions, and in accordance with the answers to the answered questions, as discussed more fully below.

Accordingly, the present example implementation may enable customers to substantially forgo, configuring and/or updating business planning software. Several business planning processes (which may be associated with different business planning models and/or sub-models) may be selectively and incrementally rolled out to customer end users (e.g., users of customer end-user system(s) 24). Furthermore, integration between added features (e.g., sets of software functionality associated with different business processes) is automatically accommodated, e.g., via dynamic integrator 42 and feature-artifact mapping module 38 of business planning model generation framework 14.

Furthermore, by enabling customer addition of and configuration of flex dimensions to dynamic business planning model 18, the resulting automatically handled dimensions can significantly reduce implementation time for customers to implement new features and associated business model artifacts.

Customers now have significant flexibility and options for configuring various planning business processes. Customers can leverage these configuration capabilities, reduce implementation time, and continue building the model over time, as necessary to meet the needs of the customer organization.

Furthermore, business planning models developed and deployed using system 100 may now readily evolve and adapt to meet different and/or changing business needs while remaining consistent with industry-standard best practices. Furthermore, as best practices change, dynamic business planning model 18 may adapt to comply with the new best practices.

Figure 2:
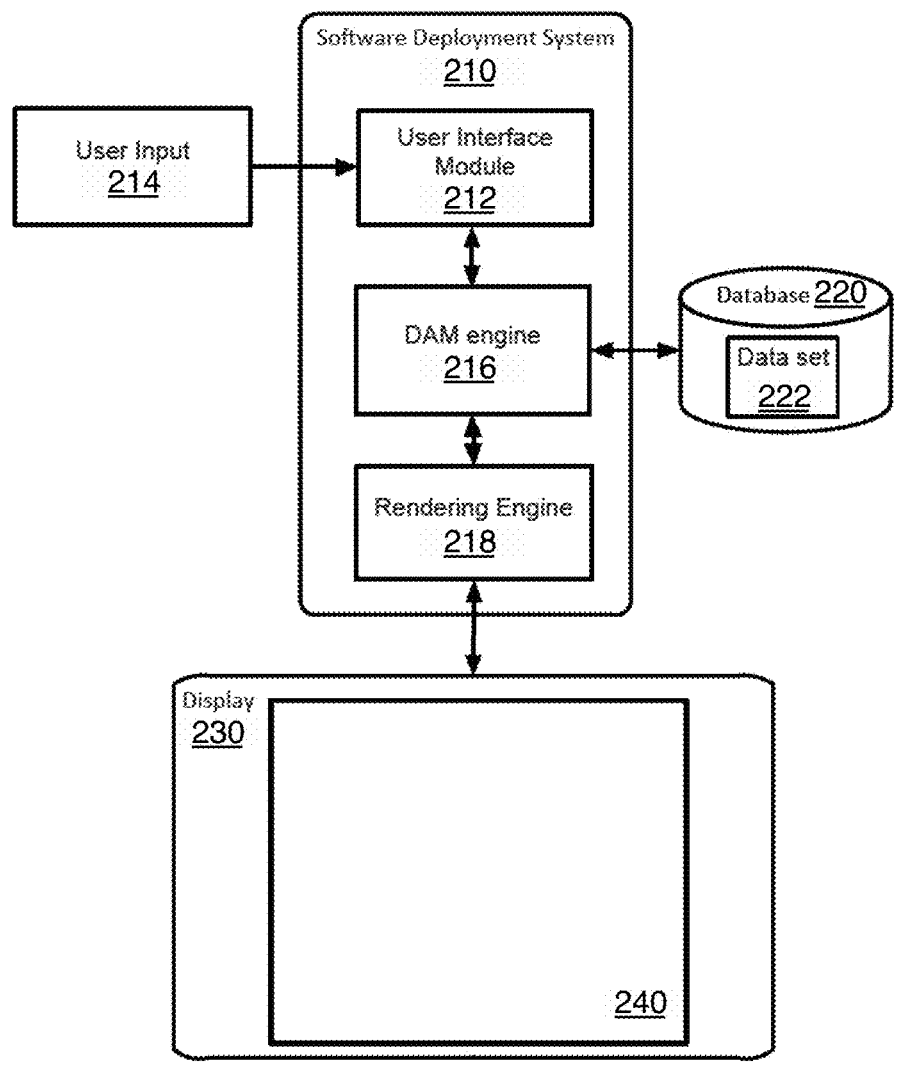
FIG. 2 illustrates an example block diagram of a computing system, which may be used for implementations described herein.

FIG. 2 illustrates an example block diagram of a computing system 100, which may be used for implementations described herein. Computing system 100 provides an interface layer, such as an application program interface (API). The interface layer provides users with seamless connectivity between different instantiations of an application located in different environments (e.g., development environment, production environment, etc.). Computing system 100 may be any computing system, such as an enterprise computing environment, client-server system, and the like.

Computing system 200 also includes software management system 210, also referred to herein as software deployment system 210. Software management system 210 may include a user interface module 212. User interface module 212 may be configured to receive and process data signals and information received from a user interface 214, also referred to herein as user input 214. For example, user interface module 212 may be adapted to receive and process data from user input associated with data for processing via software management system 210. Software management system 210 is configured to process data received from user interface 214, such as a keyboard, mouse, etc. for receiving user input.

Software management system 210 may also include a process engine 216, also referred to herein as digital asset management (DAM) engine 216, and a rendering engine 218. Process engine 216 may be configured as an API or any interface or data structure that may be used to advantage.

In some implementations, computing system 100 may include a data source such as database 120. Database 120 may be connected to the software management system 110 directly or indirectly, for example via a network connection, and may be implemented as a non-transitory data structure stored on a local memory device, such as a hard drive, solid state drive (SSD), flash memory, and the like, or may be stored as a part of a cloud network, as further described herein.

Database 120 may contain one or more data sets 122. Data sets 122 may include data as described herein. Data sets 122 may also include data pertaining to data attributes, data hierarchy, nodal positions, values, summations, types of charts of visualizations, algorithms, code (e.g., C++, Javascript, JSON, etc.), source, security, hashes, XML, and the like. In addition, data sets 122 may also contain other data, data elements, and information such as metadata, labels, development-time information, run-time information, configuration information, API, interface component information, library information, pointers, and the like.

In various implementations, software management system 110 is connected to a display 130 configured to display data 140 (e.g., graphical data, etc.), for example, to a user thereof. Display 130 may be a passive or an active display, adapted to allow a user to view and interact with display data 140 displayed thereon, via user interface 114. In other configurations, display 130 may be a touch screen display responsive to touches, gestures, swipes, and the like for use in interacting with and manipulating display data 140 by a user thereof. Gestures may include single gestures, multi-touch gestures, and other combinations of gestures and user inputs adapted to allow a user to convert, model, generate, deploy, and maintain display data 140.

In various implementations, process engine 116 may be adapted to receive data from user interface 114 and/or database 120 for processing thereof. In one configuration, process engine 116 is a software engine configured to receive and process input data from a user thereof pertaining to display data 140 from user interface 114 and/or database 120 in order to provide the process API layer.

Process engine 116 in other implementations may be configured as a data analysis tool to perform analysis functions associated with display data 140. Such analysis functions may include determining attributes associated with the data, partitions, local and remote pods (layers), communication protocols, determining the relationships to other data, interpreting metadata associated with the data, and the like. For example, process engine 116 may be configured to receive and analyze data sets 122 to determine user interface configuration, data processing instructions, data attributes, data hierarchy, nodes, nodal positions within the hierarchy, values, summations, algorithms, source, security, hashes, and the like, associated with data sets 122.

Process engine 116 may receive existing data sets 122 from database 120 for processing thereof. Such data sets 122 may include and represent a composite of separate data sets 122 and data elements pertaining to, for example, organizational data, which may include employment data, salary data, personnel data, and the like. In addition, data sets 122 may include other types of data, data elements, and information such as contact data, sales data, production data, scientific data, financial data, medical data, census data, and the like.

Rendering engine 118 may be configured to receive configuration data pertaining to display data 140, associated data sets 122, and other data associated with display data 140 such as user interface components, icons, user pointing device signals, and the like, used to render display data 140 on display 130. In one exemplary implementation, rendering engine 118 may be configured to render two-dimensional (2D) and three-dimensional (3D) graphical models and simulations to allow a user to obtain more information about data sets 122. In one implementation, upon receiving instruction from a user, for example, through user interface 114, rendering engine 118 may be configured to generate a real-time display of interactive changes being made to display data 140 by a user thereof.

Note that the computing system 100 presents a particular example implementation, where computer code for implementing embodiments may be implemented, at least in part, on a server. However, embodiments are not limited thereto. For example, a client-side software application may implement software management system 110, or portions thereof, in accordance with the present teachings without requiring communications between the client-side software application and a server.

Figure 3:
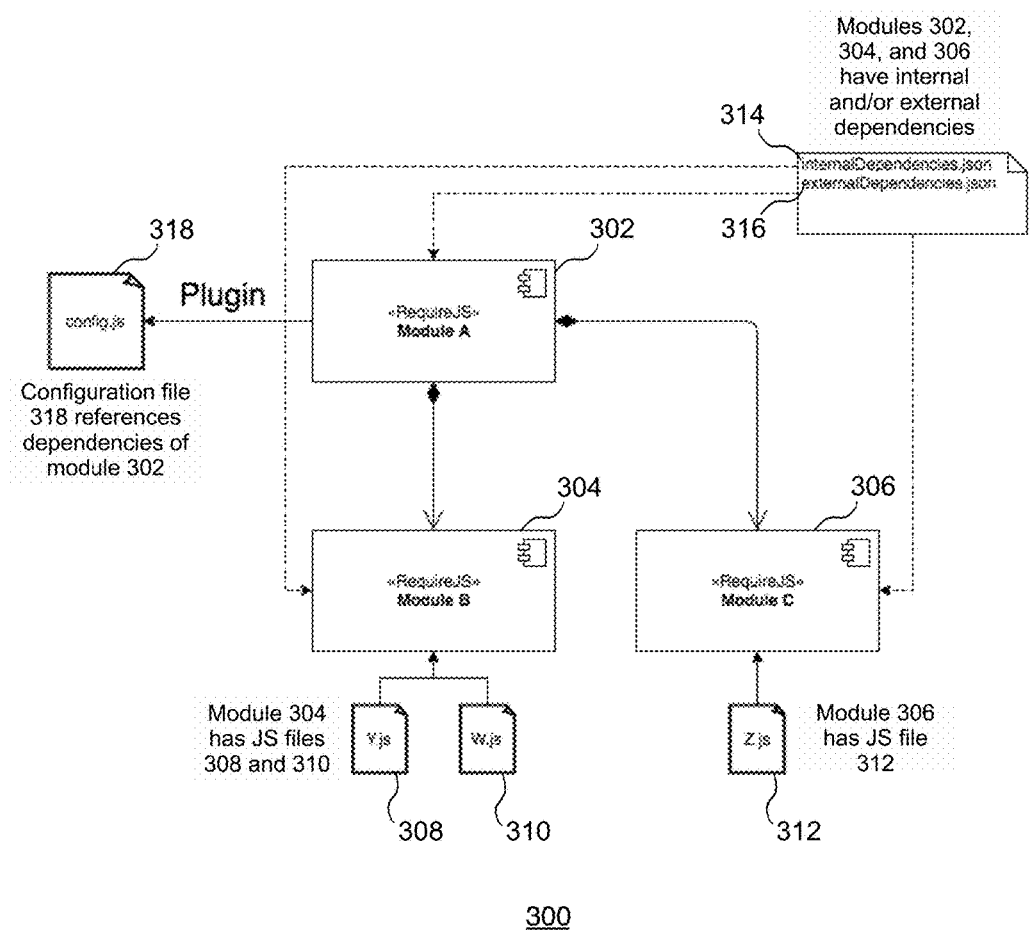
FIG. 3 illustrates an example module environment, according to some implementations.

FIG. 3 illustrates an example module environment 300, according to some implementations. Shown are a module 302 (labeled Module A), a module 304 (labeled Module B), and module 306 (labeled Module C). In various implementations, modules 302, 304, and 306 are part of a software program for a process such as a business process. As described in more detail herein, the software program may provide a business planning model such as business planning model 18 of FIG. 1 and/or any business process management software system that manages business processes.

In various implementations, modules 302, 304, and 306 are independently developed modules that are combined into one software program for a process. Modules 302, 304, and 306 may be developed independently by different developers located in one or more geographic locations (e.g., around the world). As described in more detail herein, each module contains program code having program instructions. In various implementations, the modules may be also referred to as software modules. Implementations described herein may be implemented using developer system 12 in combination with planning model generation framework 14 and dynamic business planning model 18 of FIG. 1, and/or software deployment system 210 of FIG. 2.

As indicated herein, modules 302, 304, and 306 may be developed independently by different developers located in one or more geographic locations. Also, each module may be developed by a team of developers in an organization. Each team may develop one or more different modules. As such, in various implementations, environment 300 may not have all of the modules and components shown and/or may have other elements including other types of modules and components instead of, or in addition to, those shown herein.

In some implementations, each module may include JavaScript (JS) files. In various implementations, JS files are used primarily to run client side JavaScript code on a webpage. In various implementations, a JS file includes program code with program instructions, and the JS file is used mainly to run client-side JavaScript code on a webpage. JS files may include various resources including code, data, libraries, etc. In some implementations, other files such as non-JavaScript file and module loaders may be used instead of JavaScript files.

As shown, module 304 includes a JS file 308 (labeled Y.js) and JS file 310 (labeled W.js). Module 306 includes a JS file 312 (labeled Z.js). In various implementations, environment 300 may not have all of the JS files shown and/or may have other JS files instead of, or in addition to, those shown herein. For example, module 306 may have more than one JS file, module 302 may have one or more JS files, etc.

In some implementations, JS file 308 and file 310 may be associated with a particular handler. For example, JS file 308 may be associated with a process communication handler, and JS file 310 may be associated with a deployment handler. These handlers may be used to exchange messages among each other and/or with a web server. Such messages may contain process information such as commands and events.

As described in more detail herein, in various implementations, each module 302, 304, and 306 may have one or more dependencies. In various implementations, a dependency may be a resource that is referred to by one or more program instructions in the program code of a module. Such resources, or dependencies, may include classes, data, archives, libraries, APIs, web services, and other resources.

In various implementations, the dependencies may include internal dependencies, where an internal dependency and program instructions referring to the internal dependency are located in the same software module. Dependencies may also include external dependencies, and where an external dependency and program instructions referring to the external dependency are located in different software modules.

Referring still to FIG. 3, in some implementations, dependencies may be stored in a JavaScript Object Notation (JSON) file. A JSON file is a file that stores simple data structures and objects. In some implementations, internal dependencies may be stored in a JSON file 314 (labeled internalDependencies.json), and external dependencies may be stored in a separate JSON file 316 (labeled externalDependencies.json). As such, JSON files 314 and 316 may store respective internal dependencies and external dependencies of modules 302, 304, and 306.

In various implementations, each module has internal and/or external dependencies. As such, each module may have a JSON file 314 for internal dependencies and/or a JSON file 316 for external dependencies. In various implementations, for a given module, the JSON file for internal dependencies defines the JS files for the given module, and the JSON file for external dependencies defines the files used from another module or files from third parties.

As shown in FIG. 3, module 304 includes JS file 308 (Y.js) and JS file 310 (W.js). These JS files include internal dependencies to which code in module 304 refers. As described herein, module 304 has a JSON file 314 for internal dependencies (e.g., internalDependencies.json). In various implementations, JSON file 314 for module 304 includes internal dependency paths. In other words, JSON file 314 for module 304 includes the JS files in module 304. In various implementations, the JSON file for a given module includes all of the JS files for that module. The following are example internal dependency paths in JSON file 314 for module 304:

```
moduleB/internalDependencies.json
{
    "Y":"path/to/Y",
    "W":"path/to/W"
},
``` where module B corresponds to module 304, "Y" corresponds to JS file 308, "path/to/Y" corresponds to an internal dependency path to JS file 308, "W" corresponds to JS file 310, and "path/to/W" corresponds to an internal dependency path to JS file 310. For ease of illustration, two internal dependency paths are shown. In various implementations, JSON file 310 for module 304 may have any number of JS files.

As described herein, module 304 has a JSON file 316 for external dependencies (e.g., externalDependencies.json). In various implementations, JSON file 316 for module 304 includes external dependency paths. The following is an example external dependency path in JSON file 316 for module 304:

```
moduleB/externalDependencies.json
{
    "jquery":"path/to/jquery"
},
``` where module B corresponds to module 304, "jquery" corresponds to an external third party jquery file, "path/to/jquery" corresponds to an external dependency path to the jquery file. As indicated in the previous example, in some implementations, JSON file 316 may include third-party dependencies. JSON file 316 may also include external dependencies to one or more other modules. For ease of illustration, one external dependency path is shown. In various implementations, JSON file 316 for module 304 may have any number of external dependency paths.

The following is example internal dependency path in JSON file 314 for module 306:

```
moduleC/internalDependencies.json
{
    "Z":"path/to/Z",
},
``` where module C corresponds to module 306, "Z" corresponds to JS file 312, and "path/to/Z" corresponds to an internal dependency path to JS file 312. For ease of illustration, one internal dependency path is shown. In various implementations, JSON file 312 for module 306 may have any number of internal dependency paths.

The following is example external dependency path in JSON file 316 for module 302:

```
moduleA/externalDependencies.json
{
    "A":"path/to/A",
},
``` where module A corresponds to module 302, "A" corresponds to one or more JS files of module 304, "path/to/A" corresponds to an external dependency path to the JS files of module 304.

As described herein, external dependencies are external to a given module. In various implementations, there may be external dependencies referred to, where such external dependencies that are at other modules. There may also be third-party external dependencies referred to, where such external dependencies are at third-party locations.

In some implementations, where a given module refers to external dependencies at other modules, the system need not necessarily list those dependencies in a JSON file. Instead, in various implementations, the given module may refer to a configuration file that lists all dependencies (e.g., internal dependencies, external dependencies to other modules, and third-party external dependencies). Such configuration files are described in more detail herein. In some implementations, a JavaScript file such as a RequireJS file may be used to manage JS files, including their internal dependencies 314 and external dependencies 316.

In some implementations, the system enables each of the modules 302, 304, and 306 to initiate generation of a configuration file. Each of the modules 302, 304, and 306 may utilize a plugin to generate a configuration file. In various implementations, the plugin of the system searches and analyzes the JSON file of internal dependencies of module 302, the JSON file of external dependencies of module 302, and references to external dependencies in the application code of module 302. The plugin of the system then builds configuration file 318.

As shown in FIG. 3, module 302 utilizes a plugin to generate a configuration file 318 (labeled config.js). In various implementations, the plugin may be used for a task runner such as a JavaScript task runner (e.g., Grunt). The plugin may be used with the task runner and with different node package manager (NPM) packages and Bower modules using RequireJS. While some example implementations are described in the context of module 302 using the plugin in order to generate a configuration file 318. Other modules such as module 304 and module 306 may also use the plugin in order to generate a configuration file 318 for those respective modules.

In this example implementation, configuration file 318 references dependencies of module 302, where such dependencies include internal dependencies at module 302, external dependencies at other modules (e.g., modules 304 and 306), and external dependencies at third-parties. The following are example internal dependency paths and external dependency paths in configuration file 318 for module 302:

```
moduleA/config.js
require.config({
    paths: {
        "A": "path/to/A",
        "Y": "moduleB/path/to/Y",
        "W": "moduleB/path/to/W",
        "Z": "moduleC/path/to/Z",
        "jquery": "moduleB/path/to/jquery"
    }
}
);
``` where the dependency paths are the same as those in the JSON files. As indicated herein, in various implementations, where a given module refers to external dependencies at other modules, the system need not necessarily list those dependencies in a JSON file. In this example implementation, module 302 refer to configuration file 318 that lists all dependencies, including internal dependencies, external dependencies to modules 304 and 306, and external dependencies to third-party dependencies (e.g., jquery).

In various implementations, usages of JS file 308 (Y.js), JS file 310 (W.js), JS file 312 (Z.js), and jquery would be in the application code of module 302. The following is example application code of module 302:

```
moduleA/A.js
require("Z")
``` where module A corresponds to module 302, A.js corresponds to JS files of module 302, and require ("Z") corresponds to an external dependency path to the JS file 312 (Z.js) of module 306.

In various implementations, a module that generates a particular configuration file may be referred to as the current module, with respect to the generated configuration file. In some implementations, configuration file 318 may be one of three types of configuration files. In some implementations, one type of configuration file has only internal dependency paths for the current module. This type of configuration file may be referred to as a config-nopdeps.js file. In some implementations, another type of configuration file has internal dependency paths for the current module and external dependency paths from other modules from which it depends. This type of configuration file may be referred to as a config-lib.js file. In some implementations, another type of configuration file has internal dependency paths for the current module, external dependency paths from modules from which the current module depends, and external dependency paths that other modules depend from the current module. This type of configuration file may be referred to as a config-full.js file.

Figure 4:
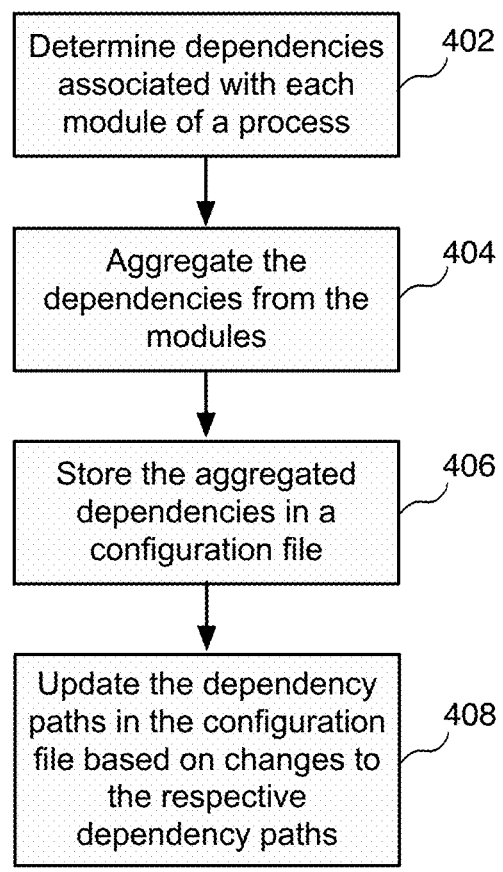
FIG. 4 illustrates an example flow diagram for managing module dependencies, according to some implementations.

FIG. 4 illustrates an example flow diagram for managing module dependencies, according to some implementations. Referring to both FIGS. 3 and 4, a method is initiated at block 402, where a system such as a server determines dependencies associated with each module of a process.

In some implementations, the system may access JSON file 314 (e.g., internal dependencies.json) to determine internal dependencies for each of the modules 302, 304, and 306. As described herein, JSON file 314 indicates the locations of internal dependencies.

The system may also access JSON file 316 (e.g., external dependencies.json) to determine external dependencies for each of the modules 302, 304, and 306 from JSON file 316. JSON file 316 indicates the locations of external dependencies.

If any of JS files 308, 310, or 312 have any internal dependencies, JSON file 314 will indicate the internal dependencies located in each of JS files 308, 310, and 312, and will indicate that JS files 308 and 310 are in module 304 and/or that JS file 312 is located in module 306. For example, if program instructions of module 304 referred to program code or other resource in JS file 308, JSON file 314 will provide the appropriate internal dependency path.

If any of JS files 308, 310, or 312 have any external dependencies, JSON file 316 will indicate the external dependencies located in each of JS files 308, 310, and 312, and will indicate that JS files 308 and 310 are in module 304 and/or that JS file 312 is located in module 306. For example, if program instructions of module 302 referred to program code or other resource in JS file 308, JSON file 314 will provide the appropriate external dependency path to the dependency.

In some scenarios, a particular internal dependency within a given module may be unique to that given module. In these scenarios, JSON file 314 would indicate the internal dependency path. In some scenarios, a particular external dependency within a given module may not be unique to that given module and may be referred to by another module. In these scenarios, JSON file 316 would indicate the external dependency path to the dependency. In some scenarios, a particular dependency within a given module may be referred to that given module and referred to by another module. In these scenarios, JSON file 314 would indicate the internal dependency path to the dependency, and JS ON file 316 would indicate the external dependency path to the same dependency. In other words, a give dependency may be referred to by multiple modules, and the dependency path would be stored in both JSON files 314 and 316. Also, multiple modules may have the same external dependencies.

At block 404, the system aggregates the dependencies associated with the modules. The system merges all internal dependencies and external dependencies of all modules 302, 304, and 306. For example, the system may merge the internal dependencies stored in JSON file 314 and external dependencies stored in JSON file 316.

At block 406, the system stores the aggregated dependencies in a configuration file 318 (labeled config.js). For example, the system may store the merged internal dependencies from JSON file 314 and external dependencies from JSON file 316 into configuration file 318.

In various implementations, configuration file 318 includes one or more dependency paths associated with each of the dependencies. In some implementations, one or more dependency paths include internal dependency paths, where a particular internal dependency path includes one or more locations of a particular internal dependency. For example, if program instructions of module 304 referred to program code or other resource in JS file 308, configuration file 318 will provide the appropriate internal dependency path.

In some implementations, one or more dependency paths include external dependency paths, where a particular external dependency path includes one or more locations of a particular external dependency. For example, if program instructions of module 302 referred to program code or other resource in JS file 308, configuration file 318 will provide the appropriate external dependency path to the dependency.

In some implementations, configuration file 318 includes dependency paths for a current module and paths from other modules on which the current module depends, external dependencies of the current module, and external dependencies of the modules on which the current module depends.

The aggregation of the dependencies provides transparent use of JS file 308, JS file 310, and JS file 312, where configuration file 318 provides dependency paths to modules 302, 304, and 306, and to JS files 308, 310, and 312, and to the particular dependencies in JS files 308, 310, and 312.

In various implementations, a plugin for causing the system to generate a configuration file such as configuration file 318 may be connected to any module. Also, multiple modules may be connected to the plugin and may initiate generation of a configuration file. In an example implementation of FIG. 3, it is appropriate for module 302 to initiate generation of configuration file 318, as module 302 requires external dependencies at both modules 304 and 306.

At block 408, the system updates one or more of the dependency paths in the configuration file based on one or more changes to one or more of the respective dependency paths. If a location of a dependency is moved (e.g., JS file 308 is moved from one location of module 304 to another location of module 304, any reference from module 302 to JS file 308 could be broken. In various implementations, RequireJS may required developers (e.g., a programmer) to update the dependencies. For example, the system may prompt and enable the developer to update the dependency and/or the dependency paths stored in the JSON files 314 and/or 316 if there are any changes to a dependency and/or dependency path. In various implementations, such updates also update configuration file 318. As such, if a location of a dependency is moved (e.g., JS file 308 is moved), any reference from module 302 to JS file 308 would not be broken, as the reference would be updated in configuration file 318.

In various implementations, the steps described herein may be implemented by developer system 12 of FIG. 1. The steps described herein may also be implemented by software deployment system 210 of FIG. 2.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 5:
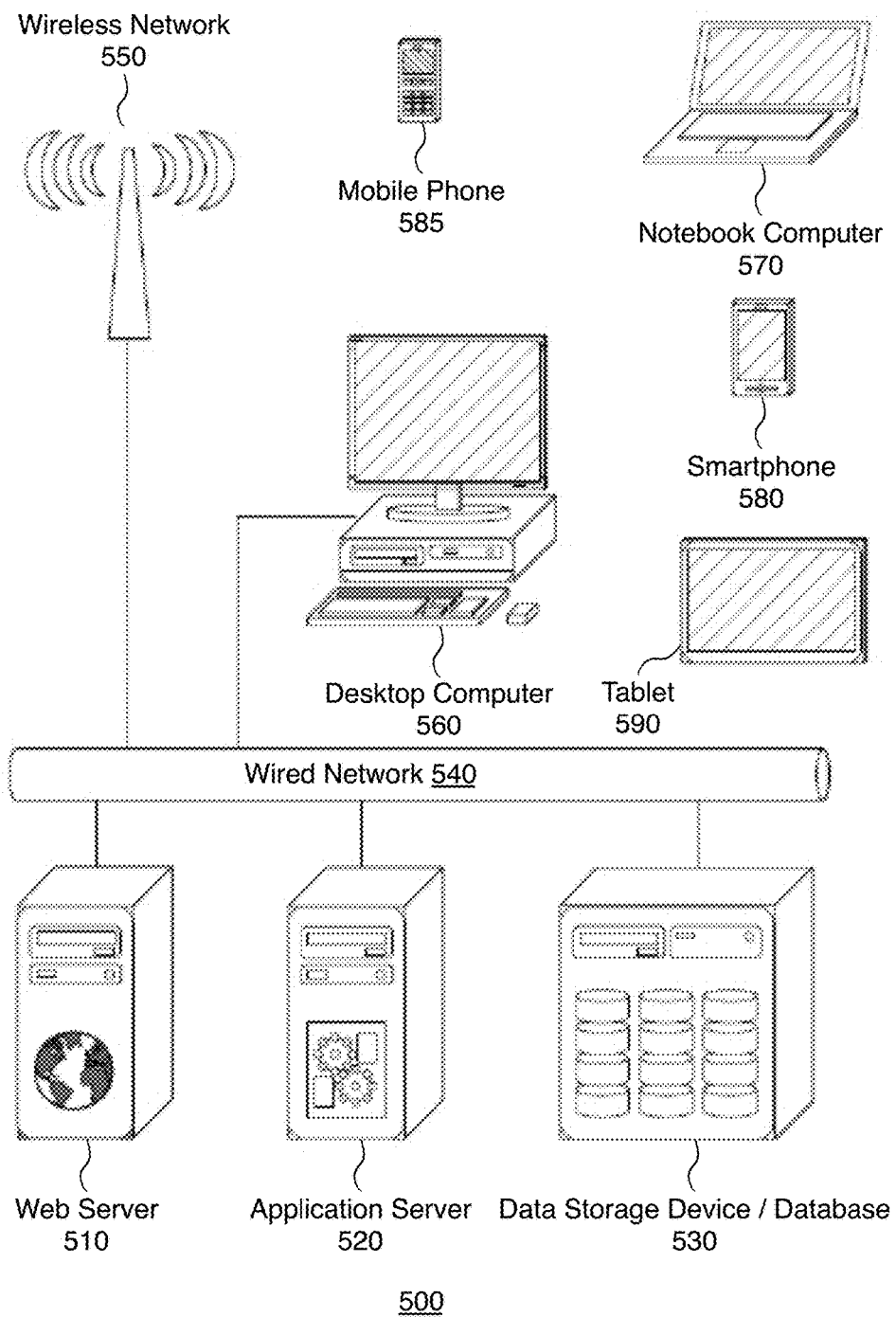
FIG. 5 illustrates an example block diagram of a system, which may be used for implementations described herein.

FIG. 5 illustrates an example block diagram of a system 500, which may be used for implementations described herein. Example system 500 is capable of supporting or running various hardware and/or software modules and associated methods discussed with reference to FIGS. 1-4. Note that certain implementations may be implemented using one or more standalone applications (for example, residing in a user device) and/or one or more web-based applications implemented using a combination of client-side and server-side code. While system 500 performs implementations described herein, in other implementations, any suitable component or combination of components associated with system 500 or any suitable processor or processors associated with system 500 may facilitate performing the implementations described herein. In various implementations, system 500 may not have all of the components shown and/or may have other elements including other types of components instead of, or in addition to, those shown herein.

General system 500 includes user devices 560-590, including one or more desktop computers 560, one or more notebook computers 570, one or more smartphones 580, one or more mobile phones 585, and one or more tablets 590. General system 500 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although system 500 is shown with five user devices, any number of user devices can be supported.

A web server 510 is used to process requests from web browsers and standalone applications for web pages, electronic documents, enterprise data or other content, and other data from the user computers. Web server 510 may also provide push data or syndicated content, such as RSS feeds, of data related to enterprise operations.

An application server 520 operates one or more applications. The applications can be implemented as one or more scripts or programs written in any programming language, such as Java, C, C++, C#, or any scripting language, such as JavaScript or European computer manufacturers association script (ECMAScript), Perl, hypertext preprocessor (PHP), Python, Ruby, or tool command language (TCL). Applications can be built using libraries or application frameworks, such as Rails, Enterprise JavaBeans, or .NET. Web content may be created using hypertext markup language (HTML), cascading style sheets (CSS), and other web technology, including templating languages and parsers.

The data applications running on application server 520 are adapted to process input data and user computer requests and can store or retrieve data from data storage device or database 530. Database 530 stores data created and used by the data applications. In some implementations, database 530 includes a relational database that is adapted to store, update, and retrieve data in response to SQL format commands or other database query languages. Other implementations may use unstructured data storage architectures and Not Only SQL (NoSQL) databases.

In some implementations, application server 520 includes one or more general-purpose computers capable of executing programs or scripts. In some implementations, web server 510 is implemented as an application running on the one or more general-purpose computers. Web server 510 and application server 520 may be combined and executed on the same computers.

An electronic communication network 540-550 enables communication between user computers 560-590, web server 510, application server 520, and database 530. In some implementations, networks 540-550 may further include any form of electrical or optical communication devices, including wired network 540 and wireless network 550. Networks 540-550 may also incorporate one or more local-area networks, such as an Ethernet network, wide-area networks, such as the Internet; cellular carrier data networks; and virtual networks, such as a virtual private network.

System 500 is one example for executing applications according to some implementations. In some implementations, application server 510, web server 520, and optionally database 530 can be combined into a single server computer application and system. In further implementations, virtualization and virtual machine applications may be used to implement one or more of application server 510, web server 520, and database 530.

In still further implementations, all or a portion of the web and application serving functions may be integrated into an application running on each of the user computers. For example, a JavaScript application on the user computer may be used to retrieve or analyze data and display portions of the applications.

In various implementations, system 500 may not have all of the components shown and/or may have other elements including other types of components instead of, or in addition to, those shown herein.

With reference to FIGS. 1, 2, and 5, developer system(s) 12, customer administrator system(s) 22, and customer end-user system(s) 24 of FIG. 1 may be implemented in whole or in part via one or more of desktop computer 560, notebook computer 570, smartphone 580, mobile phone 585, and tablet 590 of FIG. 5 and/or other computing devices such as computing system 200 of FIG. 2. In some implementations, computing devices 560-590 run browsers, e.g., used to display developer UI(s) 26 and UIs of customer administrator system(s) 22 and customer end-user system(s) 24 of FIG. 1.

In some implementations, browsers of systems 12, 22, 24 of FIG. 1 connect to the Internet, represented by wired network 540 and/or wireless network 550 as shown in FIG. 5, to access one or more network-coupled servers, databases, and/or associated cloud-based functionality, as represented by modules 14-20 of FIG. 1. Note that one or more of web server 510, application server 520, and data storage device or database 530 shown in FIG. 5 may be used to host software corresponding to modules 14-20 of FIG. 1, as detailed more fully below.

In some implementations, model artifact constructor 16, planning model generation framework 14 (including accompanying flex dimension framework 36, feature-artifact mapping module 38, runtime model generator 40, dynamic integrator 42, and UI generator 44), dynamic business planning module 18 and accompanying model adaptation module 46 (including model specifications 48, question generator 50, and answer incorporator 52), and packaging, delivery, deployment, and runtime system 20 (and accompanying cloud-deployed package 54) of FIG. 1 run in a cloud computing environment that includes a collection of plural web servers 510, application servers 520, and data storage devices 530 shown in FIG. 5.

For example, in some implementations, planning model generation framework 14 and model artifact constructor 16 of FIG. 1 run on a process cloud that communicates with a document cloud via an integration mechanism, e.g., middleware, APIs, web services, etc. The document cloud maintains data storage devices 530 of FIG. 5 to maintain data that is generated by customers, e.g., via customer end-user systems 24 of FIG. 1 through use of cloud-deployed package 54. The process cloud in combination with the document cloud act as an overall cloud that supports development, deployment, dynamic adaptation, and use of dynamic software applications and accompanying models (e.g., dynamic business planning model 18 of FIG. 1) shown in FIG. 1.

In general, software developers e.g., users of developer systems 12 of FIG. 1, may subscribe to certain cloud services to facilitate development of software applications and storage of associated files. A cloud service that is configured for software application or process flow development is called a process cloud service (PCS).

A process cloud service may employ a networked database, e.g., data storage device 530 of FIG. 5 or database 220 of FIG. 2, to store files and other objects used by a given software program being developed. Server-side development environments may be accessible to developers via browsers. The development environments may be backed by the PCS, such that developed software application files are stored in the PCS database corresponding to the one or more of data storage devices 530 of FIG. 5 or database 220 of FIG. 2.

A document cloud may include document management functionality in communication with folder structures, and documents and may incorporate functionality for adding rich metadata documents and folders. The document management functionality may include metadata services (MDS) for characterizing folders and documents and associated structures with various types of metadata. The document management functionality may further include software (which may include a combination of webpage code from web server 510 of FIG. 5 and supporting application code of application server 520 of FIG. 5, where the webpage code may call the application code using web services, APIs, etc.) for generating one or more customer UI display screens, e.g., UI display screens presented via browsers of customer administrator systems 22 and customer end-user systems 24 of FIG. 1.

In some implementations, the UI display screens include accompanying UI controls and associated options. Example options include options to browse, create, delete, define, upload, download, etc., folders, structures, and documents, etc., as maintained via the folder structures and documents.

In some implementations, browsers used by developer system 12, customer administrator system 22, and customer end-user system 24 of FIG. 1, interface with web servers 510 shown in FIG. 5 to access websites and accompanying webpage code, which is backed by applications used to implement modules 16-20 of FIG. 1. The webpage code of web servers 510 of FIG. 5 uses web services, APIs, and/or other interfacing mechanisms to communicate with application software hosted on application servers 520 of FIG. 5 of the cloud, which includes a collection of web servers 510, application servers 520, and data storage devices 530 of FIG. 5.

Various implementations discussed herein may provide substantial benefits in terms of providing efficiencies in systems and methods that achieve a new and useful end as they pertain to new software adaptability. In particular, certain implementations discussed herein uniquely leverage input from customers, the input of which may change over time as user needs change, to enable substantial hereto-for-not possible or practical dynamic software model reconfiguration and/or reconstruction.

Certain implementations may provide virtually automatic incorporation of such inputs into a seamlessly adaptable software package that is responsive to the changing user needs and automatically seamlessly handles software integrations.

Accordingly, various implementations provide new capabilities for efficient software adaptation, in part by uniquely leveraging associations between user-provided answers to questions, sets of software model artifacts, sets of software functionality, and mappings or relationships.

Figure 6:
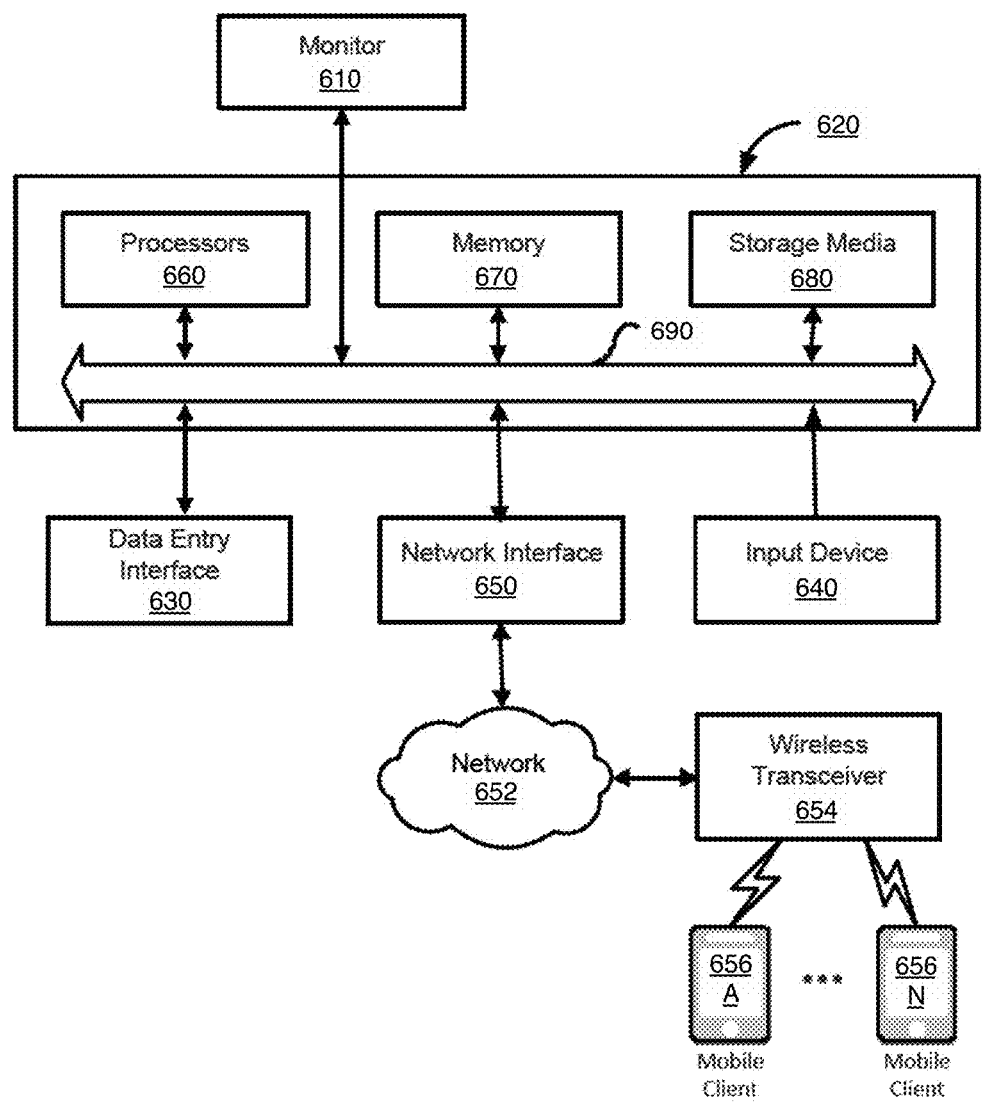
FIG. 6 illustrates an example block diagram of a network environment, which may be used for implementations described herein.

FIG. 6 illustrates an example block diagram of a network environment 600, which may be used for implementations described herein. Network environment 600 is merely illustrative and not intended to limit the scope of the claims. One of ordinary skill in the art would recognize other variations, modifications, and alternatives. For example, network environment 600 may be implemented in a distributed client-server configuration having one or more client devices in communication with one or more server systems.

In one exemplary implementation, network environment 600 includes a display device such as a monitor 610, a computer 620, a data entry interface 630 such as a keyboard, touch device, and the like, an input device 640, a network interface 650, and the like. Input device 640 is typically implemented as a computer mouse, a trackball, a track pad, wireless remote, tablet, touch screen, and the like. Moreover, input device 640 typically allows a user to select and operate objects, icons, text, characters, and the like that appear, for example, on the monitor 610.

Network interface 650 may include an Ethernet card, a modem (telephone, satellite, cable, integrated services digital network (ISDN), etc.), an (asynchronous) digital subscriber line (DSL) unit, and the like. Furthermore, network interface 650 may be physically integrated on the motherboard of computer 620, may be a software program, such as soft DSL, or the like.

Network environment 600 may also include software that enables communications over communication network 652 such as the hypertext transfer protocol (HTTP), transmission control protocol/Internet protocol (TCP/IP), real-time transport protocol/real-time streaming protocol (RTP/RTSP), protocols, wireless application protocol (WAP), Institute of Electrical and Electronics Engineers (IEEE) 802.11 protocols, and the like. In addition to and/or alternatively, other communications software and transfer protocols may also be used, for example Internetwork packet exchange (IPX), user datagram protocol (UDP) or the like.

Communication network 652 may include a local area network, a wide area network, a wireless network, an Intranet, the Internet, a private network, a public network, a switched network, or any other suitable communication network, such as for example cloud networks. Communication network 652 may include many interconnected computer systems and any suitable communication links such as hardwire links, optical links, satellite or other wireless communications links such as Bluetooth, WIFI, wave propagation links, or any other suitable mechanisms for communication of information. For example, communication network 652 may communicate to one or more mobile wireless devices 656A-N, such as mobile phones, tablets, and the like, via a base station such as wireless transceiver 654.

Computer 620 may include familiar computer components such as one or more processors 660, and memory storage devices, such as a memory 670, e.g., random access memory (RAM), storage media 680, and system bus 690 interconnecting the above components. In one embodiment, computer 620 is a PC compatible computer having multiple microprocessors, graphics processing units (GPU), and the like. While a computer is shown, it will be readily apparent to one of ordinary skill in the art that many other hardware and software configurations are suitable for use with implementations described herein. While computer 620 performs implementations described herein, in other implementations, any suitable component or combination of components associated with computer 620 or any suitable processor or processors associated with computer 620 may facilitate performing the implementations described herein. In various implementations, computer 600 may not have all of the components shown and/or may have other elements including other types of components instead of, or in addition to, those shown herein.

Memory 670 and Storage media 680 are examples of non-transitory tangible media for storage of data, audio/video files, computer programs, and the like. Other types of tangible media include disk drives, solid-state drives, floppy disks, optical storage media such as compact disc-read only memory (CD-ROMS) and bar codes, semiconductor memories such as flash drives, flash memories, read-only-memories (ROMS), battery-backed volatile memories, networked storage devices, cloud storage, and the like.

Although the description has been described with respect to particular embodiments thereof, these particular embodiments are merely illustrative, and not restrictive. For example, while various implementations discussed herein address development, deployment, and use of dynamic business planning models used to implement cloud-based enterprise software applications and associated services, implementations are not limited thereto.

Various implementations need not be deployed via an Internet cloud, but instead may be hosted on an internal enterprise server on a local network. Furthermore various implementations may be implemented as desktop software, such that the incremental updating happens on the end-user computer on which the software leveraging the dynamic planning model runs. In addition, implementations are not limited to use in conventional business applications and computing environments, and may be used, for example, by governments, universities, and other organizations to facilitate various types of planning activities. In addition, implementations need not be limited to planning software, but may be used to dynamically update different types of software that may benefit by the ability to dynamically adapt to specific needs and/or changing needs of an organization and/or associated computing environment.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium carrying program instructions thereon, the instructions when executed by one or more processors cause the one or more processors to perform operations comprising:

determining, at a server, dependencies associated with each software module of a process defined by software modules, wherein each of the software modules is associated with a respective JavaScript Object Notation (JSON) file that lists a unique set of the dependencies specific to each of the software modules;

aggregating the dependencies associated with the software modules;

storing the aggregated dependencies in one or more configuration files, wherein a configuration file includes one or more dependency paths associated with each of the dependencies and includes at least one internal dependency unique to each of the software modules; and updating one or more of the dependency paths in the configuration files based on one or more changes to one or more of the dependency paths.

2. The computer-readable storage medium of claim 1, wherein a dependency is a resource that is referred to by one or more program instructions in program code of a software module.

3. The computer-readable storage medium of claim 1, wherein the dependencies include internal dependencies, and wherein an internal dependency and program instructions referring to the internal dependency are located in a same software module.

4. The computer-readable storage medium of claim 1, wherein the dependencies include external dependencies, and wherein an external dependency and program instructions referring to the external dependency are located in different software modules.

5. The computer-readable storage medium of claim 1, wherein the instructions when executed further cause the one or more processors to perform operations comprising enabling each software module to initiate generation of the configuration file.

6. The computer-readable storage medium of claim 1, wherein the one or more dependency paths comprise internal dependency paths, wherein a particular internal dependency path includes one or more locations of a particular internal dependency.

7. The computer-readable storage medium of claim 1, wherein the one or more dependency paths comprise external dependency paths, wherein a particular external dependency path includes one or more locations of a particular external dependency.

8. A method for managing module dependencies, the method comprising:

determining, at a server, dependencies associated with each software module of a process defined by software modules, wherein each of the software modules is associated with a respective JavaScript Object Notation (JSON) file that lists a unique set of the dependencies specific to each of the software modules;

aggregating the dependencies associated with the software modules;

storing the aggregated dependencies in one or more configuration files, wherein a configuration file includes one or more dependency paths associated with each of the dependencies and includes at least one internal dependency unique to each of the software modules; and updating one or more of the dependency paths in the configuration files based on one or more changes to one or more of the dependency paths.

9. The method of claim 8, wherein a dependency is a resource that is referred to by one or more program instructions in program code of a software module.

10. The method of claim 8, wherein the dependencies include internal dependencies, and wherein an internal dependency and program instructions referring to the internal dependency are located in a same software module.

11. The method of claim 8, wherein the dependencies include external dependencies, and wherein an external dependency and program instructions referring to the external dependency are located in different software modules.

12. The method of claim 8, further comprising enabling each software module to initiate generation of the configuration file.

13. The method of claim 8, wherein the one or more dependency paths comprise internal dependency paths, wherein a particular internal dependency path includes one or more locations of a particular internal dependency.

14. The method of claim 8, wherein the one or more dependency paths comprise external dependency paths, wherein a particular external dependency path includes one or more locations of a particular external dependency.

15. An apparatus comprising:
one or more processors; and
logic encoded in one or more non-transitory computer-readable storage media for execution by the one or more processors and when executed operable to perform operations comprising:
determining, at a server, dependencies associated with each software module of a process defined by software modules, wherein each of the software modules is associated with a respective JavaScript Object Notation (JSON) file that lists a unique set of the dependencies specific to each of the software modules;
aggregating the dependencies associated with the software modules;
storing the aggregated dependencies in one or more configuration files, wherein a configuration file includes one or more dependency paths associated with each of the dependencies and includes at least one internal dependency unique to each of the software modules; and
updating one or more of the dependency paths in the configuration files based on one or more changes to one or more of the dependency paths.

16. The apparatus of claim 15, wherein a dependency is a resource that is referred to by one or more program instructions in program code of a software module.

17. The apparatus of claim 15, wherein the dependencies include internal dependencies, and wherein an internal dependency and program instructions referring to the internal dependency are located in a same software module.

18. The apparatus of claim 15, wherein the dependencies include external dependencies, and wherein an external dependency and program instructions referring to the external dependency are located in different software modules.

19. The apparatus of claim 15, wherein the logic when executed is further operable to perform operations comprising enabling each software module to initiate generation of the configuration file.

20. The apparatus of claim 15, wherein the one or more dependency paths comprise internal dependency paths, wherein a particular internal dependency path includes one or more locations of a particular internal dependency.

* * * * *